US012676866B2

(12) United States Patent
Baret et al.

(10) Patent No.: US 12,676,866 B2
(45) Date of Patent: *Jul. 7, 2026

(54) SYSTEM AND METHOD FOR MANAGING DATA OF AN AUTOMATION FIELD DEVICE IN A SECURE MANNER AGAINST MANIPULATION

(71) Applicant: Endress+Hauser SE+Co. KG, Maulburg (DE)

(72) Inventors: Marc Baret, Kembs (FR); Eric Birgel, Schopfheim (DE); Benedikt Schumann, Weil am Rhein (DE); Simon Merklin, Bahlingen a.K. (DE); Volker Frey, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 35 days.

This patent is subject to a terminal disclaimer.

(21) Appl. No.: 18/811,924

(22) Filed: Aug. 22, 2024

(65) Prior Publication Data

US 2024/0414172 A1 Dec. 12, 2024

Related U.S. Application Data

(63) Continuation of application No. 17/753,914, filed as application No. PCT/EP2020/073404 on Aug. 20, 2020, now Pat. No. 12,132,741.

(30) Foreign Application Priority Data

Sep. 18, 2019 (DE) ..................... 10 2019 125 092.7

(51) Int. Cl.
| | |
|---|---|
| *G06F 21/00* | (2013.01) |
| *H04L 9/40* | (2022.01) |
| *H04L 67/12* | (2022.01) |

(52) U.S. Cl.
CPC .............. *H04L 63/12* (2013.01); *H04L 67/12* (2013.01)

(58) Field of Classification Search
CPC ........ H04L 63/12; H04L 67/12; H04L 63/123
See application file for complete search history.

(56) References Cited

U.S. PATENT DOCUMENTS

| | | | | |
|---|---|---|---|---|
| 11,112,132 B2 * | 9/2021 | Tran | ...................... | G01M 3/184 |
| 2012/0215913 A1 * | 8/2012 | Okuno | ............... | G05B 23/0221 |
| | | | | 709/224 |

(Continued)

*Primary Examiner* — Kendall Dolly
(74) *Attorney, Agent, or Firm* — Kelly J. Smith; Endress+Hauser (USA) Holding, Inc.

(57) ABSTRACT

A decentralized distributed ledger-type database comprises a plurality of subscriber nodes, comprising validation-capable subscriber nodes, and an automation field device with an electronic unit (running a distributed ledger software stack). The field device generates measurement values and/or calibration certificates requiring verification. The field device operates as a light node of the decentralized database after running the distributed ledger software stack and transmits data to the decentralized database via the communication network and writes it in encrypted form into the database. The validation-capable subscriber nodes validate the transmitted data, and the decentralized database stores the data if at least a specified proportion of the validation-capable subscriber nodes successfully validate the data. Read-authorized subscriber nodes decrypt and read the stored data in the decentralized database, with the database storing and running smart contracts. The calibration certificates include information about a start and end of a validity period of the certificates.

10 Claims, 2 Drawing Sheets

(56)                    References Cited

U.S. PATENT DOCUMENTS

| | | | |
|---|---|---|---|
| 2016/0086175 A1* | 3/2016 | Finlow-Bates .... | G06Q 20/4015 |
| | | | 705/77 |
| 2020/0036520 A1* | 1/2020 | Kilian ................... | H04L 9/0643 |
| 2020/0225643 A1* | 7/2020 | Tugbo ................ | G05B 19/4155 |
| 2020/0228316 A1* | 7/2020 | Cahill ................... | H04L 9/3297 |
| 2020/0228342 A1* | 7/2020 | Nixon .................... | G06F 21/64 |
| 2020/0326679 A1* | 10/2020 | Maher ................... | G06Q 10/04 |
| 2020/0394552 A1* | 12/2020 | Ganapavarapu ...... | H04L 63/123 |
| 2024/0187245 A1* | 6/2024 | Stokes ................. | H04L 9/3242 |

* cited by examiner

SYSTEM AND METHOD FOR MANAGING DATA OF AN AUTOMATION FIELD DEVICE IN A SECURE MANNER AGAINST MANIPULATION

CROSS-REFERENCE TO RELATED APPLICATIONS

The present application is a Continuation application that is related to and claims the priority benefit of U.S. patent application Ser. No. 17/753,914, filed Mar. 18, 2022, German Patent Application No. 10 2019 125 092.7, filed on Sep. 18, 2019 and International Patent Application No. PCT/EP2020/073404, filed on Aug. 20, 2020, the entire contents of which are incorporated herein by reference.

TECHNICAL FIELD

The invention relates to a system and a method for managing data of a field device in a secure manner against manipulation by means of a decentralized database according to the distributed ledger technology, especially, a blockchain, wherein the decentralized database comprises a plurality of subscriber nodes, consisting of validation-capable and/or read-authorized subscriber nodes, wherein an automation field device is provided, which has an electronic unit and a communication interface.

BACKGROUND

Field devices that are used in industrial plants are already known from the prior art. Field devices are often used in process automation, as well as in manufacturing automation. Field devices, in principle, refer to all devices that are process-oriented and that supply or process process-relevant data or information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices is produced and marketed by the Endress+Hauser group.

In modern industrial systems, field devices are usually connected to higher-level units via communication networks, such as fieldbuses (Profibus®, Foundation® Fieldbus, HART®, etc.). Usually, the higher-level units are control units, such as an SPC (storage programmable controller) or a PLC (programmable logic controller). The higher-level units are used for, among other things, process control, as well as for commissioning of the field devices. The measured values detected by the field devices, especially by sensors, are transmitted via the respective bus system to a (or possibly several) higher-level unit(s) that further process the measured values, as appropriate, and forward them to the control station of the plant. The control station serves for process visualization, process monitoring and process control via the higher-level units. In addition, a data transfer is also required from the higher-level unit via the bus system to the field devices, especially for configuration and parameterization of field devices, as well as for control of actuators.

Field devices create a plurality of different data. These data are, for example, control data, for example for controlling an actuator, in addition to already mentioned measurement data of sensors, by means of which a plant operator receives information about the current process values of the measuring points of their plant. Furthermore, the data are diagnostic, historical, and/or status data by which the plant operator is informed of problems of the field devices or the current status of the individual field devices, or calibration/parameterization data.

Nowadays, it is customary to store these data at a central location in the plant, for example in a database in a workstation PC at the control level of the plant. However, this is associated with disadvantages: If the database fails or if the database is destroyed or unreadable, then the data saved on this database are lost.

Specific applications or parts of a plant must be approved officially. It is essential here that calibration certificates of the field devices are created and that the data generated by the field device can be created according to the calibration certificate or can be assigned thereto.

Nowadays, these data, or the calibration certificates, are recorded on site in an electronic operating stage. For review, an authority must go to the plant operator on site and check this operations log for correctness. A resource outlay is therefore required on the part of both the plant operator and the authority. The resource outlay of the plant operator is, for example, in the procurement and maintenance of the necessary technical means and the assurance that the data are stored invariably in the operations log. The operations log must also be available immediately if the authority requests it. The resource outlay of the authority is, for example, in the use of personnel who must travel to the plant on site and review the data there.

Often, the systems that include the operations log and the means for transmitting and recording the data are only available as proprietary systems for individual field device manufacturers. However, such a proprietary system is unpopular with plant operators, since it entails additional maintenance effort and complexity for the plant.

SUMMARY

The object of the present invention is therefore to specify an alternative to an operations log that is secure against manipulation and location-independent.

The object is achieved by a system for managing data of an automation field device in a secure manner against manipulation according to the present disclosure.

A decentralized distributed ledger-type database comprises a plurality of subscriber nodes, comprising validation-capable subscriber nodes, and an automation field device with an electronic unit (running a distributed ledger software stack). The field device generates measurement values and/or calibration certificates requiring verification. The field device operates as a light node of the decentralized database after running the distributed ledger software stack and transmits data to the decentralized database via the communication network and writes it in encrypted form into the database. The validation-capable subscriber nodes validate the transmitted data, and the decentralized database stores the data if at least a specified proportion of the validation-capable subscriber nodes successfully validate the data.

Read-authorized subscriber nodes decrypt and read the stored data in the decentralized database, with the database storing and running smart contracts. The calibration certificates include information about a start and end of a validity period of the certificates.

The system according to the invention allows the storing of data of a field device in a secure manner against manipulation, for example its measurement values and/or calibration certificates requiring verification, by using a distributed ledger database. One example of such a database is blockchain technology. However, other technologies exist for distributed ledger databases, for example based on the technology "block directed acyclic graphs (blockDAG)" or "transaction-based directed acyclic graphs (TDAG)."

Such a distributed ledger database is formed decentrally on a plurality of computing units, which are in communication with one another. These computing units are referred to as subscribers. There are various types of subscribers:

Full nodes respectively store an image of the database. Furthermore, they serve to verify transactions, i.e., for example, the storing/adding of new data in the database. They likewise serve to calculate new "blocks" (see description for FIG. 1). In connection with the invention, all full nodes are validation-capable subscriber nodes.

Referred to as light nodes are subscriber nodes that have only limited functionalities in comparison to the full nodes. For example, it can be provided that they can only write data to the database, but the content of the database is not stored in a light node and/or that they do not participate in verifications or calculations of new "blocks."

Due to the fact that the data of the field device are stored in encrypted form in the database, the data are contained in all full nodes, but can only be read by subscriber nodes that contain details regarding the encryption, i.e., for example, a key.

Field devices that are mentioned in connection with the invention are already given as examples in the introductory part of the description.

According to an advantageous development of the system according to the invention, it is provided that the decentralized database additionally comprises read-authorized subscriber nodes, wherein the read-authorized subscriber nodes are designed to decrypt and read the stored data of the field device in the decentralized database. The read-authorized subscriber nodes can be both full nodes and light nodes. The read-authorized subscriber nodes have knowledge regarding the encryption and, for example, have the key required for decryption ("public key"). Via such subscriber nodes, the plant operators or authorities can, for example, gain access to the stored data.

According to a preferred development of the system according to the invention, it is provided that at least one of the subscriber nodes or a device connected to the decentralized database is designed to run an analysis program, wherein the analysis program is designed to generate alarm messages on the basis of an analysis of the measurement values of the field device that require verification and are stored in the decentralized database. The measurement values can therefore not only be stored for documentation purposes/verification purposes, but can be used for a "predictive maintenance" application.

In an advantageous embodiment of the system according to the invention, it is provided that the analysis program is designed to compare the stored measurement values of the field device requiring verification to at least one specified limit value in the course of the analysis, and wherein the analysis program is designed to generate the alarm message in the case that at least one of the measurement values requiring verification exceeds or falls below the specified limit value.

In an advantageous embodiment of the system according to the invention, it is provided that the decentralized database is designed to store and run smart contracts as program code by means of the subscriber nodes. Smart contracts are computer protocols that map or review contracts or technically support the negotiation or execution of a contract. The smart contracts are loaded and run by the respective read-authorized subscriber node when reading the data of the field device, for example. For example, the running of such a smart contract enables the reviewing of the calibration certificate, for example whether it was still valid at all for a specific measurement value of the field device. Furthermore, a smart contract can be used to collect penalty payments if a measurement value determined by the field device shows unauthorized deviations or a calibration certificate has elapsed.

An analysis program described above can be integrated and run analogously to a smart contract in the database.

In an advantageous embodiment of the system according to the invention, it is provided that the decentralized database is a private database. A private database is available only to a specific group. Here, in contrast to a public database, there is one or more responsible parties that take care of the maintenance of the database. For example, they also determine who performs which actions and who obtains access to specific data in the database.

In an advantageous embodiment of the system according to the invention, it is provided that the communication network is based on an Ethernet protocol. If the communication interface of the field device allows wireless communication, wide-range standards, such as 5G, LTE, etc., can be used.

In an advantageous embodiment of the system according to the invention, it is provided that the field device is designed as a light node of the decentralized database to provide the data transmitted via the communication network with a time stamp. As a result, for example, the measurement values requiring verification can be assigned to a specific calibration certificate. Calibration certificates include information about the start of the validity period and the end of the validity period of the calibration certificate.

In an advantageous embodiment of the system according to the invention, the system according to the invention additionally comprises a further light node of the decentralized database in the form of an automation component, especially, a control unit, or a further field device, wherein the further light node has a clock and is designed to generate time stamps and transmit them to the decentralized database, wherein the decentralized database is designed to match the time stamps contained in the data of the field device to the time stamp of the further light node. The further light node, which especially is an automation component adjacent to the field device, i.e., for example, an automation component used at the same measuring point, serves as a further instance to reliable data of the field device by verifying the time stamp.

The present disclosure includes a method for managing data of a field device in a secure manner against manipulation using a decentralized database according to the distributed ledger technology, such as a blockchain, wherein the decentralized database comprises a plurality of subscriber nodes consisting of validation-capable and/or read-authorized subscriber nodes, wherein an automation field device is provided, which has an electronic unit and a communication interface. The method includes establishing a communication connection between the field device and the decentralized database using the communication interface via a wired or wireless communication network and adding the field device to the decentralized database as a light node by running a distributed ledger software stack using the electronic unit. Data is generated using the field device that includes measurement values and/or calibration certificates requiring verification. The data is transmitted via the communication network to the decentralized database via the communication network, wherein the data are encrypted. The method also includes validating the decentralized database using the validation-capable subscriber nodes and writing the data to the decentralized database if at least a specified proportion of the validation-capable subscriber nodes successfully validates the data. The decentralized database additionally comprises read-authorized subscriber nodes, wherein the read-authorized subscriber nodes are designed to decrypt and read the stored data of the field device in the decentralized database, and the decentralized database is designed to store and run smart contracts as program code using the subscriber nodes. The calibration certificates include information about a start of a validity period and an end of a validity period of the calibration certificates. The read-authorized subscriber nodes review the validity period of the calibration certificates using smart contracts.

According to an advantageous embodiment of the method according to the invention, it is provided that the method additionally comprises decrypting and reading the data by means of the read-authorized subscriber nodes.

BRIEF DESCRIPTION OF THE DRAWINGS

The invention is explained in greater detail with reference to the following figures. The figures show:

FIG. 1 shows an illustration of a database DB, which is designed according to a distributed ledger technology. In the present case, the database DB is based on the blockchain technology. The blockchain technology became known as a backbone of the Internet currency "Bitcoin." A blockchain, i.e., a chain of associated data blocks BL1, BL2, BL3, allows high data integrity. The mode of operation of a database DB that is used for the invention is briefly explained below.

As a rule, said data block BL1, BL2, BL3 consists of at least two components: On the one hand, this is a data field DF. Data in the form of transactions TA are saved in this data field DF. A transmission of the data from a first subscriber node TK1, TK2, . . . , TK6 to a second subscriber node TK1, TK2, . . . , TK6 in a communication network, for example the Internet, is referred to as a transaction TA. A transaction TA contains a transmitted value, for example data of the field device FG, and the transmitter and the recipient of the transaction TA. All devices that form the database or are connected thereto and allow the distributed ledger functionality are referred to as subscriber nodes TK1, TK2, . . . , TK6.

A data field DF of a data block BL1, BL2, BL3 contains at least one transaction TA, more frequently several transactions TA.

On the other hand, a data block BL1, BL2, BL3 contains a checksum #1, #2, #3. Such a checksum #1 #2 #3 is a hash value and is created by sometimes complex calculations. For this purpose, all transactions TA of the data field of a block BL1, BL2, BL3 are calculated to form an intermediate value. To accomplish this, the Merkle root of the total number of transactions TA is calculated. The exact functional principle will not be discussed at this point. For this purpose, reference is made, for example, to https://en.wikipedia.org/wiki/Merkle_tree.

Figure 1:
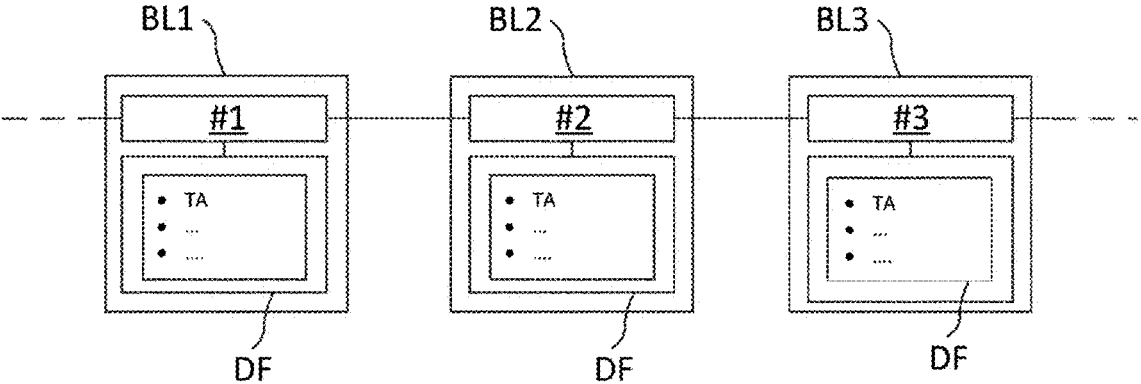
FIG. 1 shows an illustration of a database designed according to the distributed ledger technology.

This calculated intermediate value is then used with the checksum #1, #2, #3 of the previous data block BL1, BL2, BL3 to calculate the checksum #1, #2, #3 of the current data block BL1, BL2, BL3. For example, the data block BL2 shown in FIG. 1 contains a checksum #2. This checksum #2 has thus been calculated from the transactions TA stored in the data field DF of the data block B2 and the checksum #1 of the preceding data block BL1. Analogously, the data block BL3 shown in FIG. 1 contains a checksum #3. This checksum #3 has thus been calculated from the transactions TA stored in the data field DF of the data block B3 and the checksum #2 of the preceding data block BL2.

The integrity of the data, thus the protection of the data against subsequent manipulations, is thus protected by the storage of the checksum #1, #2, #3 of the preceding data block BL1, BL2 in the respectively subsequent data block BL2, BL3. A blockchain thus consists of a series of data blocks BL1, BL2, BL3, in each of which one or more transactions TA are combined and provided with the checksum #1, #2, #3. A change of data generates a changed intermediate value, as a result of which the checksum #1, #2, #3 of the respective data block BL1, BL2, BL3 is also changed. The subsequent data block BL1, BL2, BL3 thus no longer matches the preceding data block BL1, BL2, BL3. Data of a data block BL1, BL2, BL3 that has been successfully validated once are therefore no longer changeable for an attacker.

New data blocks BL1, BL2, BL3 are created at regular intervals. All transactions TA that were created after the time at which the last data block BL1, BL2, BL3 was created are stored in the data field of the new data block BL1, BL2, BL3.

The complexity of block creation can be increased in that the created checksum #1, #2, #3 must have a predefined format. For example, it is established that the checksum must be 24 digits long, wherein the first four digits must have the numerical value 0. For this purpose, in addition to the intermediate value of the transactions TA and the checksum of the previous data block, a number sequence to be determined, referred to as "nonce," with a defined length is used for calculating the checksum #1, #2, #3 of the current data block BL1, BL2, BL3. The calculation of the new checksum #1, #2, #3 accordingly takes longer, since only a few nonces are present, which result in the calculation of a checksum #1, #2, #3 with the specified criteria. The finding of such a suitable nonce causes the described additional time expenditure.

After the checksum #1, #2, #3 of a new data block BL1, BL2, BL3 has been created, the data block is transmitted to all subscriber nodes TK1, TK2, . . . , TK6. The validation-capable subscriber nodes TK1, TK2, TK3, TK4 now review the checksum #1, #2, #3 of the new data block BL1, BL2, BL3. Only after successful validation is the data block BL1, BL2, BL3 stored in all subscriber nodes TK. Successful validation by more than half of all validation-capable subscriber nodes TK1, TK2, TK3, TK4 is especially required for this purpose. For introducing/creating a foreign, malicious data block BL1, BL2, BL3, an attacker would therefore have to manipulate or control a large number of validation-capable subscriber nodes TK1, TK2, TK3, TK4, in order to successfully validate the introduced data block BL1, BL2, BL3. With an increasing number of validation-capable subscriber nodes TK1, TK2, TK3, TK4, this must be considered to be basically impossible.

Much less effort is required to validate a data block BL1, BL2, BL3 than to create the data block BL1, BL2, BL3. The checksum #1, #2, #3 is back-calculated, the intermediate value of the transactions TA or the checksum #1, #2, #3 of the previous data block BL1, BL2, BL3 is recovered and compared to the actual intermediate value or to the actual checksum #1, #2, #3 of the previous data block BL1, BL2, BL3. If these values match, the data block BL1, BL2, BL3 is successfully validated.

Figure 2:
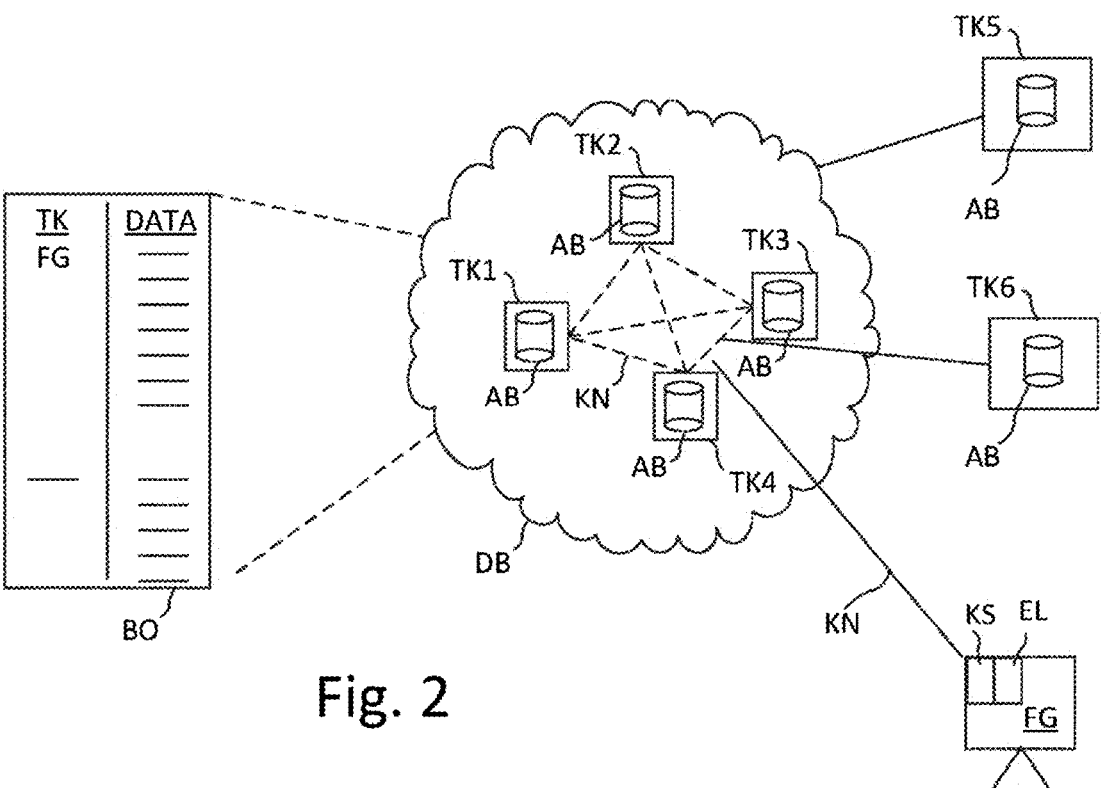
FIG. 2 shows an exemplary embodiment of the system according to the present disclosure.

The following describes how, with the aid of such a database DB, data of a field device of process automation can be stored in a secure manner against manipulation and can be read for verification purposes:

FIG. 2 schematically illustrates the system according to the invention. The database DB, which is constructed as described above, consists of the core of four subscriber nodes TK1, TK2, TK3, TK4, which are designed as full nodes. These each store an image AB of the content of the database DB, i.e., the chain of the data blocks DB1, DB2, DB3. Two further, read-capable subscriber nodes TK5, TK6 are connected to the database DB. Furthermore, an automation field device FG is connected, especially, in an Ethernet-based manner, to the database DB by means of a communication interface KS via a communication network KN. By running a distributed ledger software stack, the field device FG a subscriber node and operates as a light node in the database DB, thus can write data to the database DB. However, it cannot verify any transactions. It also does not contain any image AB of the content of the database DB.

The field device FG detects measurement values that require verification and must be reviewed by an authority at irregular intervals. For this reason, the field device loads these measurement values and associated calibration certificates as data DATA into the database DB. Before transmitting, the database encrypts these data DATA with a private key. Subsequently, the transmitted data DATA are validated as transaction TA by the validation-capable subscriber nodes TK1, TK2, TK3, TK4 and stored in a data field DF of a data block of the database.

For review, the authority can access the database DB and read the data DATA by means of a computer, which functions as a read-capable subscriber node TK5. For this purpose, the subscriber node TK5 has received a public key in advance, by means of which key the decryption is made possible.

In the same way, it is possible for the plant operator to access the database DB and to read the data DATA by means of a computer, which functions as a read-capable subscriber node TK6.

A dashboard BO, which visualizes the data, is displayed to both subscriber nodes TK5, TK6. In the present case, the dashboard DO consists of two columns. The first column shows the names of the subscriber node TK1, . . . , TK6 whose data are stored. The second column shows the data assigned to the subscriber nodes TK1, . . . , TK6 shown in the first column, i.e., for example, the measurement values of the field device FG and possibly assigned calibration certificates.

As a further feature, so-called smart contracts can be stored in the database DB. Smart contracts are computer protocols that map or review contracts or technically support the negotiation or execution of a contract. They can be stored in the database and run as program code by means of the subscriber nodes TK1, . . . , TK6. The running takes place especially when reading the data DATA on the read-capable subscriber nodes TK5, TK6. For example, the running of such a smart contract enables the reviewing of the calibration certificate, for example whether it was still valid at all for a specific measurement value of the field device. Furthermore, a smart contract can be used to collect penalty payments if a measurement value determined by the field device FG shows unauthorized deviations or a calibration certificate has elapsed.

Analogously to the smart contracts, analysis programs can be stored in the database DB, which programs can be run by means of the subscriber nodes TK5, TK6 when reading the data. Such an analysis program serves, for example, for the purpose of comparing the stored measurement values of the field device FG requiring verification in the course of the analysis to at least one specified limit value and to generate an alarm message in the case that at least one of the measurement values requiring verification exceeds or falls below the specified limit value.

The invention claimed is:

1. A system for managing data of an automation field device in a secure manner against manipulation, comprising:
   a decentralized database,
   comprising a plurality of subscriber nodes comprising validation-capable subscriber nodes;
   an automation field device,
   wherein the automation field device includes an electronic unit and a communication interface,
   wherein the electronic unit run a distributed ledger software stack, and wherein the communication interface establishes a communication connection to the decentralized database via a wireless or wired communication network,
   wherein the field device generates data comprising measurement values and calibration certificates requiring verification,
   wherein the field device operates as a light node of the decentralized database after running the distributed ledger software stack and transmits the data to the decentralized database via the communication network and writes them in encrypted form into the decentralized database,
   wherein the validation-capable subscriber nodes validate the transmitted data, wherein the decentralized database stores the data when at least a specified proportion of the validation-capable subscriber nodes successfully validates the data;
   wherein the decentralized database additionally comprises read-authorized subscriber nodes, wherein the read-authorized subscriber nodes decrypt and read the stored data of the field device in the decentralized database;
   wherein the decentralized database stores and runs smart contracts as program code using the subscriber nodes;
   wherein the calibration certificates include information about a start of a validity period and an end of a validity period of the calibration certificates;
   wherein the read-authorized subscriber nodes review the validity period of the calibration certificates using smart contracts.

2. The system according to claim 1, wherein at least one of the subscriber nodes or a device connected to the decentralized database run an analysis program, wherein the analysis program generates alarm messages on the basis of an analysis of the measurement values of the field device that require verification and are stored in the decentralized database.

3. The system according to claim 2, wherein the analysis program is compares the stored measurement values of the field device requiring verification in the course of the analysis to at least one specified limit value, and wherein the analysis program is designed to generate the alarm message in the case that at least one of the measurement values requiring verification exceeds or falls below the specified limit value.

4. The system according to claim 1, wherein the decentralized database stores and run smart contracts as program code using the subscriber nodes.

5. The system according to claim 1, wherein the decentralized database is a private database.

6. The system according to claim 1, wherein the communication network is based on an Ethernet protocol.

7. The system according to claim 1, wherein the field device is designed as a light node of the decentralized database to provide the data transmitted via the communication network with a time stamp.

8. The system according to claim 7, additionally comprising a further light node of the decentralized database in the form of an automation component, wherein the further light node has a clock and generates time stamps and transmit them to the decentralized database, wherein the decentralized database matches the time stamps contained in the data of the field device to the time stamps of the further light node.

9. A method for managing data of a field device in a secure manner against manipulation using a decentralized database, wherein the decentralized database comprises a plurality of subscriber nodes consisting of validation-capable and/or read-authorized subscriber nodes, wherein an automation field device is provided, which has an electronic unit and a communication interface, comprising:

establishing a communication connection between the field device and the decentralized database using the communication interface via a wired or wireless communication network;

adding the field device to the decentralized database as a light node by running a distributed ledger software stack using the electronic unit;

generating data using the field device, comprising measurement values and calibration certificates requiring verification;

transmitting the data via the communication network to the decentralized database via the communication network, wherein the data are encrypted;

validating the decentralized database using the validation-capable subscriber nodes;

writing the data to the decentralized database if at least a specified proportion of the validation-capable subscriber nodes successfully validates the data;

wherein the decentralized database additionally comprises read-authorized subscriber nodes, wherein the read-authorized subscriber nodes decrypt and read the stored data of the field device in the decentralized database;

wherein the decentralized database stores and runs smart contracts as program code using the subscriber nodes;

wherein the calibration certificates include information about a start of a validity period and an end of a validity period of the calibration certificates;

wherein the read-authorized subscriber nodes review the validity period of the calibration certificates using smart contracts.

10. The method according to claim 9, further comprising:

decrypting and reading the data using read-authorized subscriber nodes.

\* \* \* \* \*